(12) United States Patent  
Duvernier et al.

(10) Patent No.: US 10,131,105 B2  
(45) Date of Patent: *Nov. 20, 2018

(54) METHOD OF MANUFACTURING A TIRE TREAD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Marc Duvernier, Clermont-Ferrand (FR); Vincent Abad, Clermont-Ferrand (FR); Frederic Perrin, Clermont-Ferrand (FR); Emmanuel Custodero, Clermont-Ferrand (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 94 days.

This patent is subject to a terminal disclaimer.

(21) Appl. No.: 14/365,061

(22) PCT Filed: Dec. 14, 2012

(86) PCT No.: PCT/EP2012/075516  
§ 371 (c)(1),  
(2) Date: Jun. 12, 2014

(87) PCT Pub. No.: WO2013/087828  
PCT Pub. Date: Jun. 20, 2013

(65) Prior Publication Data  
US 2015/0000827 A1   Jan. 1, 2015

(30) Foreign Application Priority Data  
Dec. 16, 2011 (FR) .................................. 11 61796

(51) Int. Cl.  
*B29D 30/66* (2006.01)  
*B29D 30/06* (2006.01)  
(Continued)

(52) U.S. Cl.  
CPC ......... *B29D 30/66* (2013.01); *B29D 30/0662* (2013.01); *B29D 30/68* (2013.01);  
(Continued)

(58) Field of Classification Search  
CPC .............................. B29D 30/66; B29D 30/68; B29D 2030/0612; B29D 2030/0613;  
(Continued)

(56) References Cited

U.S. PATENT DOCUMENTS 2,648,618 A * 8/1953 Palumbo ............... F16D 69/022  
156/191  
3,850,872 A * 11/1974 Marzocchi ................. C08J 5/08  
523/211

(Continued)

FOREIGN PATENT DOCUMENTS

EP 0320215 6/1989  
EP 0510550 A1 10/1992  
(Continued)

OTHER PUBLICATIONS

PCT/EP2012/075516, International Search Report (ISR), Form PCT/ISA/210, dated Feb. 28, 2013 (including English translation), 7 pgs.

*Primary Examiner* — Martin K Rogers  
(74) *Attorney, Agent, or Firm* — Dickinson Wright PLLC

(57) ABSTRACT

Method of manufacturing a tire tread having a plurality of raised elements, each having a contact face intended to come into contact with a ground when the tire is rolling and lateral faces connected to this contact face. The method of manufacture comprises:
  preparing a green form of the tire;
  laying a cover layer over all or part of an external surface of the green tire;

(Continued)

laying the green tire in a mold;
with the mold comprising a blade, using this blade to mold a lateral face of a raised element;
vulcanizing the green tire to obtain the tire
cutting the cover layer using cutting means belonging to the mold;
during the molding of the lateral face driving with the blade a cut part of the cover layer into the green tire so that the lateral face of the raised element is partially or fully covered.

6 Claims, 3 Drawing Sheets

(51) Int. Cl.
    *B29D 30/68*     (2006.01)
    *B29D 30/52*     (2006.01)
    *B29K 9/06*     (2006.01)
    *B29K 67/00*     (2006.01)
    *B29K 311/10*     (2006.01)

(52) U.S. Cl.
    CPC ............ *B29D 2030/0612* (2013.01); *B29D 2030/526* (2013.01); *B29D 2030/667* (2013.01); *B29K 2009/06* (2013.01); *B29K 2067/003* (2013.01); *B29K 2311/10* (2013.01)

(58) Field of Classification Search
    CPC ........ B29D 2030/662; B29D 2030/665; B29D 2030/667; B29D 2030/685; B29C 51/32; B29C 2793/0081
    See application file for complete search history.

(56) References Cited

U.S. PATENT DOCUMENTS

| | | | | |
|---|---|---|---|---|
| 4,442,618 | A * | 4/1984 | Minter | B60C 13/001 |
| | | | | 152/523 |
| 5,614,041 | A | 3/1997 | Dumke et al. | |
| 5,814,169 | A * | 9/1998 | Yamaguchi | B60C 11/11 |
| | | | | 152/209.2 |
| 5,840,137 | A * | 11/1998 | Futamura | B60C 11/00 |
| | | | | 152/209.1 |
| 5,950,700 | A * | 9/1999 | Fukuoka | B29D 30/0606 |
| | | | | 152/209.23 |
| 6,044,882 | A | 4/2000 | Crawford et al. | |
| 6,402,490 | B1 * | 6/2002 | Menard | B29D 30/0602 |
| | | | | 425/36 |
| 2004/0103974 | A1 * | 6/2004 | Majumdar | G09F 3/04 |
| | | | | 152/524 |
| 2006/0032569 | A1 * | 2/2006 | Zimmer | B60C 13/001 |
| | | | | 152/524 |
| 2006/0174986 | A1 * | 8/2006 | Ogawa | B29D 30/60 |
| | | | | 152/152.1 |
| 2007/0039672 | A1 | 2/2007 | Lo | |
| 2007/0095447 | A1 * | 5/2007 | Nguyen | B60C 11/12 |
| | | | | 152/209.18 |

FOREIGN PATENT DOCUMENTS

| | | | | |
|---|---|---|---|---|
| GB | 1033324 | * | 6/1966 | ......... B29D 30/0061 |
| GB | 1124915 | | 8/1968 | |
| WO | WO 2010/077375 | * | 7/2010 | ............ B60C 11/13 |

* cited by examiner

METHOD OF MANUFACTURING A TIRE TREAD

This application is a 371 national phase entry of PCT/EP2012/075516, filed 14 Dec. 2012, which claims benefit of FR 1161796, filed 16 Dec. 2011, the entire contents of which are incorporated by reference for all purposes.

BACKGROUND

Field

The present disclosure relates to the field of tire manufacture. More specifically, the disclosure relates to the manufacture of tires the tread of which comprises a plurality of raised elements comprising on at least one of their lateral faces a cover layer.

Description of Related Art

It is known practice to design tires the tread of which comprises various rubber compounds. Document WO 03089257 discloses such treads. More specifically document WO 03089257 discloses a tread comprising raised elements. Each raised element comprises a contact face intended to come into contact with a ground when the tire is rolling along, and lateral faces connected to the contact face. All or part of the lateral faces of these raised elements are coated with a cover layer. The material of which this cover layer is made differs from the rubber compound of which the tread is made. This material notably has wet grip that is far superior to the wet grip of the rubber compound. This allows a very appreciable improvement in cornering on wet surfaces.

One method of manufacturing this tread is notably disclosed in document WO 2006069912. According to this method of manufacture, in a first step, provision is made for the material intended to constitute a cover layer to be injected in the form of one or more inserts into the green tire using an injection nozzle. The insert or inserts is or are then shaped, in a second step, by ribs of a vulcanizing mold, so that they cover lateral faces molded by the ribs.

This method of manufacture does have its limits. Specifically, while it is being shaped, the insert experiences significant shear force from the rib with a view to converting this insert into a layer of lesser thickness. This shear force may cause cracking within the insert and this makes control of the movements of the material of which this insert is made more difficult. The shape and thickness of the cover layer thus formed may therefore be somewhat haphazard. The advantages afforded by the layer to the performance of the tire are therefore reduced.

In addition, in this method of manufacture, it is necessary to align the inserts with the ribs. This then makes the manufacture of the tread more complicated.

There is therefore a need to improve the laying of a cover layer on a lateral face of a raised element belonging to a tire tread.

DEFINITIONS

A "tire" means all types of elastic tread whether or not they are subjected to an internal pressure.

A "green tire" or "green form" of a tire means a superposition of a plurality of semi-finished rubber products in the form of strips or sheets which may or may not be reinforced. The green tire is intended to be vulcanized in a mold in order to obtain the tire.

The "tread" of a tire means a quantity of rubber material delimited by lateral surfaces and by two main surfaces, one of which is intended to come into contact with a road surface when the tire is rolling along.

The "tread surface" means the surface formed by those points on the tire tread which come into contact with the road surface when the tire is rolling along.

A "raised element" means elements of the tread which are delimited by grooves and/or by sipes. Within the "raised element" category, a distinction is made between tire ribs, which make a full revolution of the tire, and blocks which do not make a full revolution of the tire.

A "mold" means a set of separate molding elements which, when brought relatively closer together, delimit a toroidal molding cavity.

The "molding surface" of a mold means the surface of the mold that is intended to mold the surface of the tire tread.

A "blade" of a mold means a protrusion projecting from the molding surface. Within the category of blades, a distinction is made between sipe blades which are less than 2 mm wide and ribs which have a width of 2 mm or more. The sipe blades are intended to mold sipes in the tread of the tire, which means cuts that at least partially close in the contact patch where the tire makes contact with the ground. The ribs are intended to mold grooves in the tread, which means cuts that do not close up in the contact patch where the tire makes contact with the ground.

A "molding step" or "step of molding" a lateral face of a molding element means an operation which begins at the moment that a blade of a mold comes into contact with a cover layer covering an external surface of a green tire. During this molding step, the blade forms a cut, this cut then delimiting a lateral face of a molding element. The molding step ends at the moment that the blade leaves the cut it has just molded.

SUMMARY

The invention, in an embodiment, relates to a method of manufacturing a tire tread, this tread comprising a plurality of raised elements formed in a given rubber material. Each raised element comprises a contact face intended to come into contact with a ground when the tire is rolling along and lateral faces connected to this contact face. This method of manufacture comprises a step of preparing a green form of the tire, a step of laying a cover layer over all or part of an external surface of the green tire, a step of laying the green tire in a mold, with this mold comprising a blade, a step of using this blade to mold a lateral face of a raised element, and a step of vulcanizing the green tire in order to obtain the tire. The method of manufacture also comprises a step of cutting the cover layer using cutting means belonging to the mold, and during the molding of the lateral face of the raised element by the blade, a step whereby this blade drives a cut part of the cover layer into the green tire so that the lateral face of the raised element is partially or fully covered by this cut part.

Using the method of manufacture of the embodiment of the invention, a cover layer is positioned on a lateral face of a raised element in a simple and practical way.

In the special case where the blade is a rib of a width of 2 mm or more, the surface area for contact of this rib with the cover layer, at the moment of contact between the rib and the layer, is great enough to allow this cover layer to be driven into the depth of the green tire while at the same time limiting deformations, notably deformations within its thickness. As a result, the cover layer will become positioned more or less uniformly against the walls of the groove formed by the rib as this groove is gradually molded.

It will also be noted that the cover layer here is cut by elements of the mold which will thus directly tailor this cut to the characteristics of the desired tread pattern. Manufacture of a tread comprising raised elements with a cover layer on all or part of their lateral walls thus becomes easier.

As an alternative, the cutting of the cover layer by the cutting means belonging to the mold is performed before the molding of the lateral face.

Thus it is ensured that, at the moment that the blade of the mold comes into contact with the cover layer to drive it into the green tire, this layer will have been fully cut. Thus any risk of the cover layer tearing as a result of the pressure applied by the blade to this layer is avoided.

In another alternative form, the cutting of the cover layer by the cutting means belonging to the mold is performed during the course of the molding of the lateral face.

In another alternative form, the position of the cutting means with respect to the blade is adjusted prior to the step of cutting the cover layer.

It is thus possible easily to adjust the quantity of material of the cover layer present in the cut molded by the blade. By adjusting the position of the cutting means appropriately, it is further possible to limit the unattractive presence of excess cover layer material outside the cut.

As an alternative, with the cutting means being removable, cutting means suited to the characteristics of the cover layer are fitted in the mold.

Thus the mold is adapted to suit the characteristics of this layer.

As an alternative, the cover layer is wound onto the external surface of the green tire, across the width of this green tire.

This then makes it easier for this cover layer to be applied to the green tire.

As an alternative, the cover layer comprises an elastomeric material and a collection of woven or nonwoven fibres, these fibres being impregnated with this elastomeric material.

By using fibres in the cover layer, the mechanical integrity of this layer is enhanced, making it easier to cut. Further, the presence of a collection of fibres in the cover layer makes it possible, because of the intrinsic rigidity of these fibres, to limit the extensibility of the cover layer as it is being cut, making it easier to apply to the green tire. Finally, impregnating the fibres with the elastomeric material provides the whole with excellent cohesion. The cover layer thus behaves as an entity when it is being cut and applied to the green tire. The fibres may be impregnated by hot calendering, molding in a press or injection molding under pressure.

As an alternative, the elastomeric material is prevulcanized during the step of impregnating the fibres.

Through this prevulcanizing step, the ability of the cover layer to slip over the surface of the green tire is improved.

Another subject of an embodiment of the invention is a tread manufactured according to a method of manufacture as described hereinabove.

BRIEF DESCRIPTION OF THE DRAWINGS

Other features and advantages of embodiments of the invention will become apparent from the following description, given by way of nonlimiting example, with reference to the attached drawings in which.

DETAILED DESCRIPTION OF SPECIFIC EMBODIMENTS

In the description which follows, elements that are substantially identical or similar will be denoted by identical references.

Figure 1:
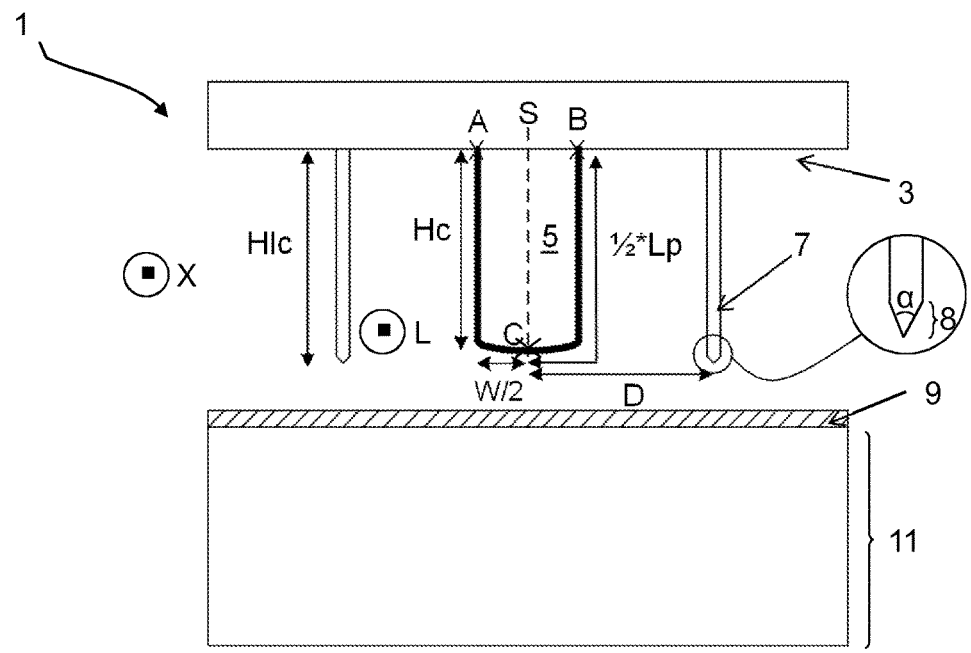
FIG. 1 schematically depicts a molding element for implementing a method of manufacture according to the invention.

FIG. 1 depicts a molding element 1 for implementing a method of manufacture according to an embodiment of the invention.

More specifically, the molding element 1 comprises a molding surface 3 intended to mold part of the tread surface of a tire. The molding element 1 also comprises blades 5 of which just one is depicted here to make the invention easier to understand. The blade in this instance is a rib 5 intended to mold a groove in the tire tread. A "groove" in a tread means a cut in this tread of a width, i.e. the distance separating two lateral walls of this groove, greater than 2 mm. The rib 5 extends heightwise and projects from this molding surface 3. The rib 5 also extends lengthwise in a direction of extension X. In the mold, this direction may be a circumferential direction following the circumference of the mold. As an alternative, the direction of extension is a transverse direction perpendicular to the circumferential direction of the mold. In another alternative form, this direction of extension is an oblique direction making a non-zero angle with the circumferential direction and with the transverse direction of the mold.

FIG. 1 depicts the molding element 1 viewed in a plane of section perpendicular to the direction of extension X. In this plane of section, the rib 5 has a cross section exhibiting symmetry with respect to an axis of symmetry S. The axis of symmetry S in this instance extends through the height Hc of the rib 5 and divides this rib 5 into two half-ribs of width W/2.

The cross section of the rib is of rectangular shape here. A "rectangular shape" means that the upper face of the rib is perpendicular to the lateral faces of this rib, i.e. that the lateral faces of the rib make with the upper face of this rib an angle of between 85° and 95°.

The invention also encompasses instances in which the regions of connection between the lateral faces of the rib and the upper face of this rib are rounded and instances in which the regions of connection between the lateral faces of the rib and the base are likewise rounded.

In additional alternative forms of embodiment, the cross section of the rib may adopt a shape other than rectangular, such as a square shape, a triangular shape, etc.

It will also be noted that the cross section of the rib 5 has, between two points of intersection A and B of the rib 5 with the molding surface 3, a profile indicated in bold line in FIG. 1. This profile has a profile length Lp such that Lp=2*(Hc+

W/2), i.e. that the profile length Lp corresponds to twice the height Hc of the rib 5 plus the width W of this rib.

In the example of FIG. 1, the points of intersection A and B are readily determinable, the lateral walls of the rib 5 being perpendicular to the molding surface 3. As an alternative, in instances in which the lateral walls of the rib are connected to the molding surface 3 by two rounded regions of connection forming two circular arcs, the points of intersection A and B respectively correspond to the intersection of the circular arcs with straight lines passing through the centres of the arcs of a circle and dividing these arcs into two identical ½ arcs.

The molding element 1 of FIG. 1 also has two cutting means 7 arranged either side of the rib 5. These cutting means extend lengthwise in a direction parallel to the direction of extension X of the rib 5. A "parallel direction" means that the direction of extension of the cutting means makes an angle of between −5° and +5° with the direction of extension X of the rib. The height Hlc of the cutting means is at least equal to the height Hc of the rib.

Each cutting means comprises an end 8 able to cut a cover layer 9 covering a green form 11 of a tire. More specifically, each cutting means at its end comprises a cutting edge (depicted in the form of a point in FIG. 1). This cutting edge has, in the plane of FIG. 1, an angle α less than or equal to 60° (refer to the enlarged detail associated with FIG. 1 which is an enlargement of the end of one of the two cutting means 7). In a preferred embodiment, the angle α is less than or equal to 35°.

It will be noted that this cutting edge may have been pre-hardened in order to improve its long-term mechanical integrity. For example, the cutting edge may have been hardened in a special heat treatment. As an alternative, it is possible to plan for the material of which the cutting edge is made to be stronger than the remainder of the molding element.

It will also be noted that the cutting means 7 are arranged in the molding element 1 in such a way that the distance D between each end of the cutting means and the axis of symmetry S of the cross section of the rib 5 is less than or equal to half the length Lp of the profile of the cross section, such that D=Hc+W/2. Stated differently, the axis of symmetry S intersects the profile of the rib 5 at a point C to define two sub-profiles. A first sub-profile corresponds to the segment A-C and a second sub-profile corresponds to the segment B-C. For each cutting means, the distance between the edge of this cutting means and the axis of symmetry S is less than or equal to the length of the sub-profile adjacent to this cutting means, i.e. the sub-profile belonging to the half-rib closest to the cutting means. In the example of FIG. 1, the sub-profile closest to the cutting means 7 is the sub-profile corresponding to the segment B-C.

It is also possible to adjust the distance D of the cutting means with respect to the blade. In this way, the cut part is given a length suited to ensuring that the part of the cover layer that is cut and pushed into the tread will, for example, lie flush with the surface of this tread. This distance D can be adjusted by successive trial and error. To do that, it is possible for example to affix these cutting means in the mold and detach them therefrom as desired.

Furthermore, in an alternative form of embodiment, the cutting means may be fitted removably in the molding element, thus making it possible to use cutting means suited to the characteristics of the cover layer that is to be cut.

Figure 2A:
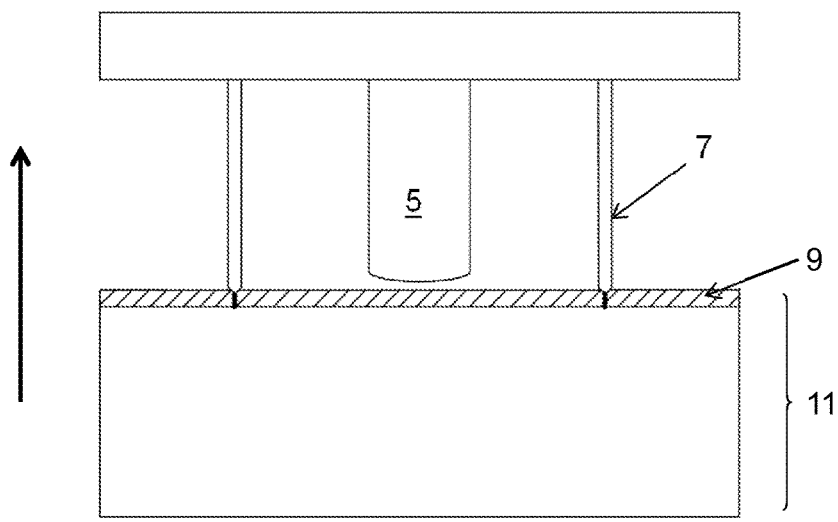
FIG. 2a illustrates a step of cutting the layer of special material according to the method of manufacture according to the invention.
Figure 2B:
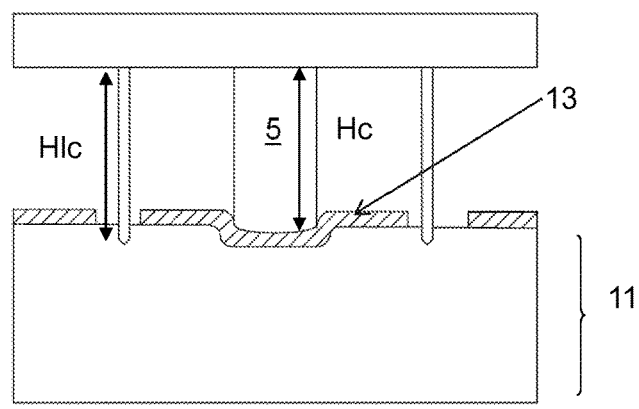
FIG. 2b illustrates a step whereby a blade of the molding element drives part of the cover layer into a green tire.
Figure 2C:
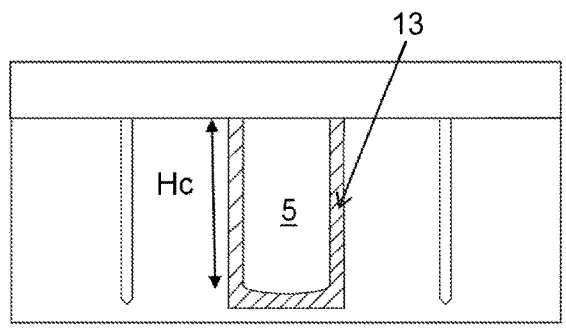
FIG. 2c illustrates an intermediate molding step in which the cutting means and the blade are completely positioned in the green tire.

FIGS. 2a to 2c illustrate in greater detail the various steps for implementing the method of manufacture.

FIG. 2a discloses a step of cutting the cover layer. In this step, the molding element 1 and the green tire 9 move closer to one another. This movement is, for example, initiated by a membrane (not depicted) in the mold. Under the action of a quantity of pressurized steam, this membrane swells and pushes the green tire towards the molding element 1. More specifically, FIG. 2a shows the moment at which the cutting means 7 begin to cut the cover layer 9 into a plurality of parts in this instance all of the same thickness. This cutting step is made easier by the action of the cutting edges of the cutting means.

FIG. 2b illustrates a step whereby the blade drives part of the cover layer into the green tire. In this step, the rib 5 pushes into the green tire 11. More specifically, in this step the rib 5 comes into contact with a part 13 cut in the cover layer. The rib 5 thus drives this part 13 into the depth of the green tire 9.

It will be noted here that the height Hlc of the cutting means 7 is greater than the height Hc of the rib 5. Thus, the cutting step of FIG. 2a occurs before the step in which the rib 5 pushes into the green tire 11. As an alternative, it is possible to plan for the height Hlc of the cutting means 7 to be identical to the height Hc of the rib 5. In this case, the step of FIG. 2a and the step of FIG. 2b occur simultaneously.

FIG. 2c illustrates an intermediate molding step in which the rib 5 is pushed into the green tire over its entire height Hc. The entirety of the part 13 of the cover layer thus finds itself inside the green tire. Once this step has been performed, it is then possible to vulcanize the green tire, i.e. to convert the rubber material of which the green tire is made from the plastic state to the elastic state. This vulcanizing step may also modify the internal structure of the cover layer.

Figure 2D:
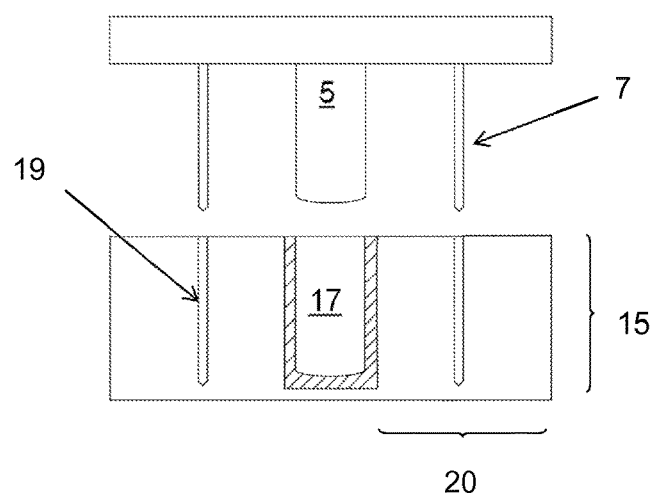
FIG. 2d schematically depicts part of the tread of a tire following the steps of FIGS. 2a-2c.

FIG. 2d depicts the result of the various steps of molding and vulcanizing the green tire illustrated in FIGS. 2a to 2c. The part of the tread 15 thus obtained comprises a groove 17 obtained by molding rubber around the rib 5 and two sipes 19 obtained by molding rubber around the two cutting means 7. It will be noted here that all of the walls of the groove, i.e. the lateral walls and the bottom wall flanked by the lateral walls, are covered with the cut part 13 of the cover layer.

Depending on the type of material of which the cover layer is made, the block 20 delimited in part by the groove 17 may be given special properties. Thus, where there is a desire to improve the grip of the tread on snow, use may be made of a cover material that has a dynamic shear modulus G* under a maximum alternating stress of 0.7 MPa, at a frequency of 10 Hz and a temperature of −10° C., higher than 60 MPa and preferably higher than 200 MPa.

In the present document, the terms "elastic modulus G'" and "viscous modulus G''" denote dynamic properties well known to those skilled in the art. These properties are measured on a Metravib VA4000 visco analyser on test specimens molded from uncured compounds. Test specimens such as those described in standard ASTM D 5992-96 (the version published in September 2006, initially approved in 1996) figure X2.1 (circular embodiment) are used. The diameter of the test specimen is 10 mm (and it therefore has a circular cross section of 78.5 mm$^2$), the thickness of each of the portions of rubber compound is 2 mm, giving a "diameter-to-thickness" ratio of 5 (in contrast with the standard ISO 2856, mentioned at paragraph X2.4 of the ASTM standard which recommends a d/L value of 2). The response of a test specimen of vulcanized rubber compound subjected to a simple alternating shear sinusoidal stress at a frequency of 10 Hz is recorded. The test specimen experiences sinusoidal shear loadings at 10 Hz, with the stress (0.7

MPa) applied symmetrically about its position of equilibrium. The measurements are taken during an increase in temperature gradient of 1.5° C. per minute, from a temperature Tmin below the glass transition temperature (Tg) of the material, up to a temperature $T_{max}$ which may correspond to the rubber plateau of the material. Before commencing the sweep, the test specimen is stabilized at the temperature Tmin for 20 min in order to have a uniform temperature throughout the test specimen. The result exploited is the dynamic shear elastic modulus (G') and the shear viscous modulus (G") at the chosen temperatures (in this instance, 0°, 5° and 20° C.). The "complex modulus" G* is defined as the absolute value of the complex sum of the elastic modulus G' and viscous modulus G": $G^* = \sqrt{(G'^2 + G''^2)}$.

In an alternative form of embodiment, the elastomeric material of the cover layer comprises a compound based on at least one diene elastomer with a very high sulphur content, such as ebonite.

In another alternative form of embodiment, the cover layer comprises a collection of fibres, for example a three-dimensional collection of fibres forming a felt. The fibres of this felt may be selected from the group consisting of textile fibres, mineral fibres and mixtures thereof. It will also be noted that the fibres of this felt may be selected from the group of textile fibres of natural origin, for example from the group of silk, cotton, bamboo, cellulose, wool fibres and mixtures thereof.

In another alternative form of embodiment, the elastomeric material of the cover layer comprises a compound based on at least one thermoplastic polymer, such as polyethylene terephthalate (PET). Such a polymer may have a Young's modulus higher than 1 GPa.

It will be noted that the cover layer may be a single layer. As an alternative, the cover layer may comprise several layers of different compounds. For example, the material constituting the lower part of the cover layer in contact with the green tire may be selected in such a way as to improve the ability of the cover layer to slip on the green tire when the rib is driving this cover layer into the depth of the green tire. The material of which the lower layer is made may, for example, be cotton or prevulcanized rubber. Similarly, the material of which the upper part of the cover layer is made is selected for the properties to be imparted to the tread, for example better grip on snowy ground.

Prior to the molding step, the method of manufacture comprises a step of preparing the green form of the tire, a step of applying the cover layer to all or part of the external surface of the green tire and a step of laying the green tire thus covered in a mold comprising the molding element 1.

The step of preparing the green tire involves laying strips of rubber, in which reinforcing threads are embedded, onto a support that is substantially of revolution. Conventionally, the reinforcing threads are substantially parallel to the axis of revolution of the green tire support.

Once the green tire has been prepared, it is possible to cover the external surface of this green tire with the cover layer. This cover layer may cover all or part of this external surface. It will be noted that the cover layer is formed from one or more strips wound onto the external surface of the green tire, across the width of this green tire. As an alternative, this layer is formed from one or more strips wound on the circumference of the green tire.

The green tire covered with the cover layer is then placed in a mold.

A number of tire production trials using treads comprising cover layers in the cuts have been carried out.

Table 1 describes the various tests carried out.

Table 2 gives the formulations of the elastomeric materials used, and Table 3 sets out the results of friction tests carried out.

TABLE 1

|  | A1 | A2 | A3 | A4 | A5 |
| --- | --- | --- | --- | --- | --- |
| Collection of fibres | Cotton fabric (1) | Cotton fabric (1) | Viscose felt (2) | Viscose felt (2) | Viscose felt (2) |
| Elastomeric material | ME1 | ME2 | ME2 | ME2 | ME2 |
| Stacking | Strip of cotton 1 layer of elastomeric material | Strip of cotton 1 layer of elastomeric material | 1 mm of baize 2 layers of elastomeric material | 1 mm of baize 2 layers of elastomeric material | 1 mm of baize 1 layer of elastomeric material |
| Impregnation conditions | T = 160° C. P = 16 bar T = 9 minutes | T = 160° C. P = 16 bar T = 9 minutes | T = 160° C. P = 16 bar T = 11 minutes | T = 160° C. P = 16 bar T = 20 minutes | T = 160° C. P = 16 bar T = 9 minutes |

(1) Cotton fabric (Coco coupon, Cournon-d'Auvergne)
(2) Viscose felt, 100% viscose, 275 g/m, thickness: 1 mm (www.feutrine-express.fr).

TABLE 2

|  | ME1 (phr) | ME2 (phr) |
| --- | --- | --- |
| NR (1) | 40.0 |  |
| SBR (2) | 60.0 |  |
| SBR (3) |  | 100.0 |
| Carbon black (4) | 37.5 | 10.0 |
| Liquid plasticiser (5) | 2.0 |  |
| Liquid plasticiser (6) |  | 10.0 |
| Plasticising resin (7) |  | 17.1 |
| ZnO (8) | 10 | 1.5 |
| Stearic acid (9) | 1.0 | 3.0 |
| 6PPD (10) | 2.0 | 2.2 |
| Sulphur | 27.0 | 1.4 |
| CBS (11) | 13.5 | 1.6 |

(1) Natural rubber (RSS#3);
(2) SBR solution (contents expressed in dry SBR: 23% styrene, 15% polybutadiene groups at 1-2 and 70% polybutadiene groups at 1-4 trans (Tg = −52° C.);
(3) SBR solution (contents expressed in dry SBR: 44% styrene, 41% polybutadiene groups at 1-2 (Tg = −12° C.);
(4) Carbon black N234;
(5) MES oil (Shell "Catanex SNR");
(6) TDAE oil (Hansen & Rosenthal "Vivatec 500");
(7) Type C5 hydrocarbon resin (Crayvalley "Wingtack 86");
(8) Zinc oxide (industrial grade - Umicore);
(9) Stearine (Uniquema "Pristerene");
(10) N-1,3-dimethylbutyl-N-phenylparaphenylenediamine (Flexsys "Santoflex 6-PPD"); DPG = diphenylguanidine (Flexsys "Perkacit DPG");
(11) N-cyclohexyl-2-benzothiazyl-sulphenamide (Flexsys "Santocure CBS").

Table 1 describes the various tests performed.

The first test A1 was performed with a cover layer made up of a cotton fibre fabric by way of collection of fibres and a layer of a diene compound ME1 with a very high sulphur content by way of impregnating elastomeric material.

The collection was placed in a plate press under a pressure of 16 bar, at a temperature of 160° C. for a duration of 9 minutes in order to impregnate the fabric with the compound. The final thickness of the cover layer was of the order of 0.6 mm.

After impregnation, strips of cover layer were placed on the surface of a green form of tire tread. It should be noted that some of the cotton threads (the warp threads or the weft threads) were oriented perpendicular to the intended direction of travel during molding so that they would oppose any extension of the cover layer during molding.

It is preferable for the cotton fabric to be placed on the mold side rather than on the green tread side in order to make the cutting of the fabric and the slipping of the cover layer into position in the cut easier.

The assembly was then placed in a mold and the molding operations as described in FIGS. 2a to 2d were then performed without difficulty, the cotton fabric allowed the cover layer to be laid precisely in the cuts in the tread. In particular, the very fine cotton fabric was able to be cut without difficulty by the blades 7 and the rib 5 as intended drove the cover layer into the cut 3, 4 in the tread.

The elastomeric material ME1, with a very high sulphur content, behaves as uncured or with limited prevulcanization obtained during the hot impregnation under usual pressure.

Sulphur content in excess of 20 phr makes it possible to obtain a cover layer material of very high modulus (extension modulus at a deformation of 3% of the order of 300 to 1000 MPa), and this is highly favourable to grip on snowy ground.

The second test A2 was likewise performed with a cotton fabric by way of collection of fibres, but with a high-Tg compound ME2.

The impregnation conditions were the same as those of the first test, the cotton fabric was placed on the mold side and the ME2 material was prevulcanized at the time of impregnation.

Molding went well as before.

The other three tests were carried out with a viscose felt or baize as collection of fibres and with one or two layers of diene compound ME2 by way of impregnating elastomeric material.

For test A3, the viscose felt was sandwiched between two layers of ME2 compound under identical temperature and pressure conditions and for 11 minutes. This allowed the felt to become well impregnated with the compound. The final thickness of the cover layer was 1.1 mm.

The molding operations went well. That signifies that the intrinsic rigidity of the viscose felt was enough to ensure ease of slippage of the cover layer and non-extension thereof during this slippage because this layer was found to be exactly throughout the cut as indicated.

Test A4 was very similar, the only difference being a change to the impregnation time which was longer, lasting 20 minutes rather than 11. That appreciably increased the prevulcanizing of the elastomeric compound and a greater ease of slippage of the cover layer on the green form of the tread was noted.

For test A5, just one layer of diene compound ME2 was used to impregnate the viscose felt. The duration of the impregnation operation was 9 minutes. The final thickness of the cover layer was of the order of 0.6 mm.

This molding test likewise went well.

Figure 3:
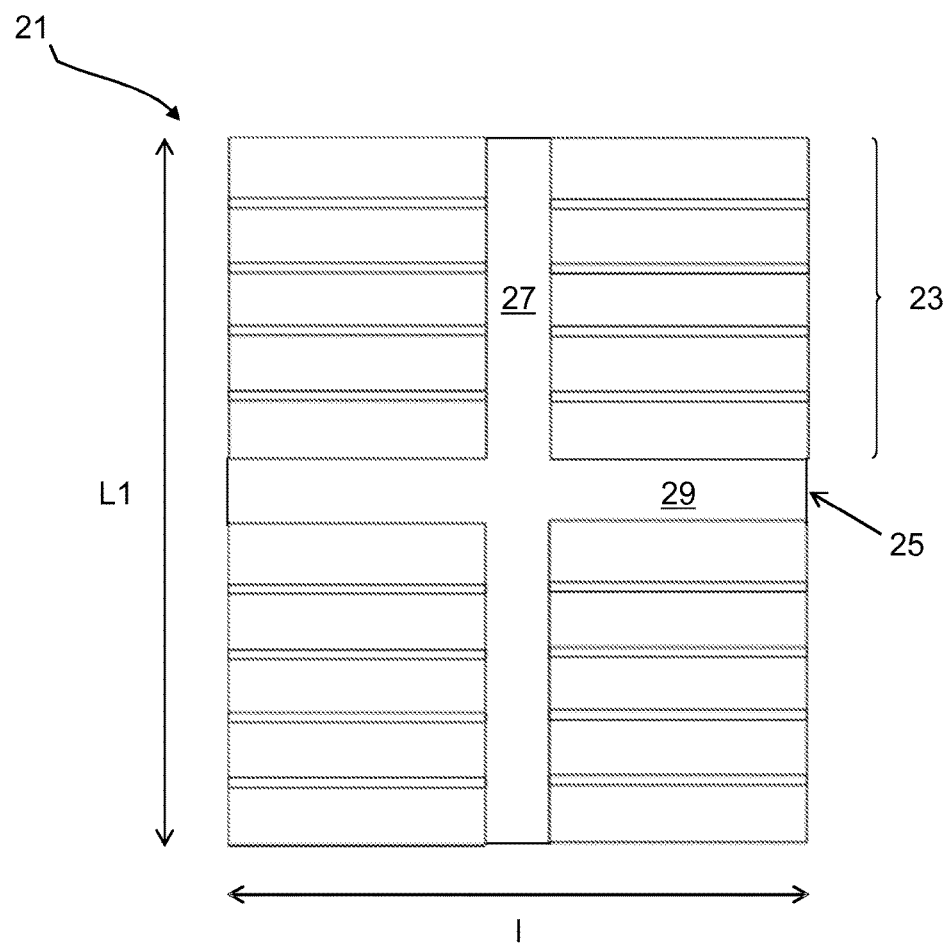
FIG. 3 depicts a view from above of a test specimen of tread obtained using the method of manufacture according to the invention.
Figure 4:
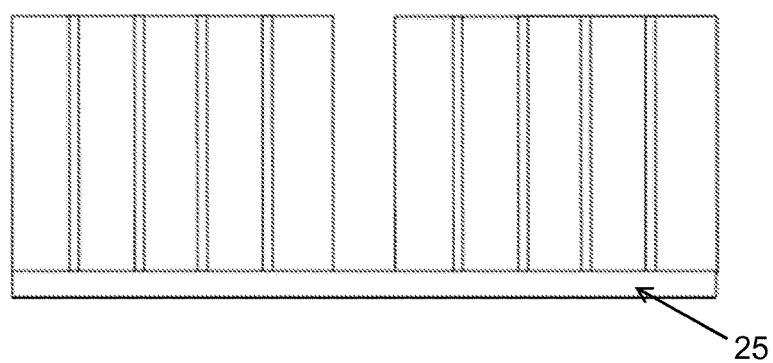
FIG. 4 depicts a side view of the test specimen of FIG. 3.

Cover layers similar to those of tests A3, A4 and A5 were also used to produce test specimens 21 visible in FIGS. 3 and 4.

The test specimen 21 used is given in a view from above in FIG. 3 and in side view in FIG. 4. This test specimen is made up of four blocks 23 of rubber compound molded on a parallelepipedal rubber support 25 (of length L1=60 mm, width l=56 mm and thickness 2 mm).

Each block has a width of 25 mm, a length of 27 mm and a height of 9 mm. These blocks are separated by a longitudinal groove 27 and a transverse groove 29, both of the order of 6 mm wide. Each block 23 has four axially oriented sipes 31. These sipes are 0.6 mm wide and divide the block into 5 equal parts. These sipes emerge at each side of the block. The test specimen is moved in the longitudinal direction normal to the axial orientation of the sipes.

The tests were carried out on a track 110 mm long, covered with compact artificial snow at a temperature of −10 C.

The load and tangential force are recorded during horizontal movement of the strip of tread. The coefficient of friction is then calculated, this being obtained by dividing the mean value of the tangential force by the load applied in the first 30 millimetres of travel.

Three thicknesses of cover layer were obtained: 1.1 mm, 0.8 mm and 0.5 mm. These test specimens were molded in such a way that all the cuts, grooves and sipes in the test specimen were covered with a layer of cover material.

A control test specimen was produced using by way of base compound a tread compound for a "snow" tire.

Friction tests on snowy ground were carried out with these test specimens and the results are given in Table 3 in terms of relative value. A value of 100 has been assigned to the result for the control test specimen, so a value greater than 100 indicates a higher coefficient of friction and therefore superior grip performance. A value below 100 signifies that the test returned a coefficient of friction lower than that of the control.

TABLE 3

| | Tread pattern test specimen | | | |
| --- | --- | --- | --- | --- |
| | Control | A3 | A4 | A5 |
| Thickness of cover layer (mm) | — | 1.1 | 0.8 | 0.5 |
| Coefficient of friction | 100 | 110 | 106 | 104 |

Compound ME2 is a compound based on an SBR with a very high glass transition temperature Tg=−12° C. The compound has a dynamic shear modulus G* of the order of 275 MPa at a temperature of −10° C., which makes the edges of the test specimens very rigid at this very low temperature. This compound also has a dynamic shear modulus that is far lower at a temperature of 60° C., below 0.4 MPa.

The invention is not restricted to the examples described and depicted and various modifications can be made thereto without departing from its scope.

The invention claimed is:

1. A method of manufacturing a tire tread, the tread comprising a plurality of raised elements, each raised element comprising a contact face adapted to come into contact with a ground when the tire is rolling along and lateral faces connected to this contact face, the method comprising:
preparing a green form of the tire;
laying a cover layer over all or part of an external surface of the green tire;
laying the green tire in a mold;

with the mold comprising one blade, using the one blade to mold one of the lateral faces of one of the raised elements;

vulcanizing the green tire in order to obtain the tire;

cutting the cover layer using cutting means belonging to the mold;

during the molding of the one lateral face of the one raised element by the one blade, driving with the one blade a cut part of the cover layer into the green tire so that the one lateral face of the one raised element are partially or fully covered by this cut part, wherein the cutting means contacts the cover layer of the green tire before the at least one blade comes in contact with the cover layer of the green tire; and wherein the cutting means includes two cutting edges disposed on opposite sides of said blade and during the step of driving with the one blade, a cut end of the cover layer created by one of the cutting edges moves away from the one cutting edge as the cover layer slips over the external surface of the green tire due to the driving of the cover layer into the green tire by the blade.

2. The method of manufacture according to claim 1, wherein the cutting of the cover layer by the cutting means belonging to the mold is performed before the molding of the one lateral face.

3. The method of manufacture according to claim 1, wherein the position of the cutting means with respect to the blade is adjusted prior to the cutting the cover layer.

4. The method of manufacture according to claim 1, wherein the cover layer is formed from one or more strips wound onto the external surface of the green tire across the width of the green tire.

5. The method of manufacture according to claim 1, wherein the cover layer comprises an elastomeric material and a collection of woven or nonwoven fibres, wherein these fibres are impregnated with this elastomeric material.

6. The method of manufacture according to claim 5, wherein the elastomeric material is prevulcanized during the impregnating of the fibres with the elastomer, prior to the laying of the cover layer over all or part of the external surface of the green tire.

* * * * *